(12) United States Patent
Hwang et al.

(10) Patent No.: US 12,518,831 B2
(45) Date of Patent: Jan. 6, 2026

(54) MEMORY DEVICE AND COMPUTER SYSTEM COMPRISING THE MEMORY DEVICE

(71) Applicant: SK hynix Inc., Icheon-si (KR)

(72) Inventors: Sung Hyun Hwang, Icheon-si (KR); Jae Yeop Jung, Icheon-si (KR); Se Chun Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 188 days.

(21) Appl. No.: 18/464,058

(22) Filed: Sep. 8, 2023

(65) Prior Publication Data

US 2024/0312523 A1    Sep. 19, 2024

(51) Int. Cl.
*G11C 16/04*    (2006.01)
*G11C 16/10*    (2006.01)

(52) U.S. Cl.
CPC .......... *G11C 16/10* (2013.01); *G11C 16/0483* (2013.01); *G11C 2216/02* (2013.01)

(58) Field of Classification Search
CPC . G11C 16/10; G11C 16/0483; G11C 2216/02; G11C 16/08; G11C 16/24; G11C 16/32; G11C 16/3427; G11C 11/4074; G11C 11/4085; G11C 11/4094; G11C 8/14
USPC ...................................... 365/185.25
See application file for complete search history.

(56) References Cited

U.S. PATENT DOCUMENTS 10,636,504 B2 *  4/2020  Reusswig ............... G11C 29/52
10,910,064 B2 *  2/2021  Rabkin ................... G11C 16/24

FOREIGN PATENT DOCUMENTS

KR    1020190006760 A    1/2019
KR    1020200061253 A    6/2020

* cited by examiner

*Primary Examiner* — Tha-O H Bui
(74) *Attorney, Agent, or Firm* — WILLIAM PARK AND ASSOCIATES LTD.

(57) ABSTRACT

A memory device applies voltage to drain select lines, which are determined individually. A program operation control unit applies a precharge voltage to a drain select line coupled to a cell string selected from the first cell string and the second cell string before a program voltage is applied to the word line, during a time determined depending on a resistance value of the drain select line coupled to the selected cell string.

19 Claims, 9 Drawing Sheets

MEMORY DEVICE AND COMPUTER SYSTEM COMPRISING THE MEMORY DEVICE

CROSS-REFERENCE TO RELATED APPLICATION

The present application claims priority under 35 U.S.C. § 119(a) to Korean patent application number 10-2023-0033253 filed on Mar. 14, 2023, in the Korean Intellectual Property Office, the entire disclosure of which is incorporated by reference herein.

BACKGROUND

1. Technical Field

Various embodiments of the present disclosure relate to a memory device and a computer system comprising the memory device, and more particularly to a three-dimensional (3D) memory device.

2. Related Art

Semiconductor memory devices may be classified as either a volatile memory device in which stored data is lost when the supply of power is interrupted or a nonvolatile memory device in which stored data is retained even when the supply of power is interrupted.

A three-dimensional (3D) semiconductor memory device may form cell strings by vertically stacking memory cells on a substrate so as to increase, i.e., improve, integration. As 3D semiconductor memory device integration improves, however, a method of individually applying a voltage to drain select lines is required.

SUMMARY

Various embodiments of the present disclosure are directed to a memory device that is capable of individually applying a voltage to drain select lines.

An embodiment of the present disclosure may provide for a memory device. The memory device may include a word line coupled to a first memory cell and a second memory cell, and a memory block including a first cell string and a second cell string, the first cell string including the first memory cell, the second cell string including the second memory cell. The memory device may also comprise a program operation control unit configured to apply a precharge voltage to a drain select line coupled to one of the first and second cell strings, before the program operation control unit applies a program voltage to the word line, the precharge voltage being applied to the drain select line during a time period having a duration, which is determined from the electrical resistance of the drain select line.

An embodiment of the present disclosure may provide for a memory device. The memory device may include a word line comprising a first memory cell and a second memory cell, a memory block comprising a first cell string and a second cell string, the first cell string including the first memory cell, the second cell string including the second memory cell. The memory device may also comprise a program operation control unit configured to determine whether to apply to the drain select line, a first precharge voltage or a second precharge voltage, greater than the first precharge voltage, before a program voltage is applied to the word line and during a time period determined by the drain select line resistance.

An embodiment of the present disclosure may provide for a computer system. The computer system may include a processor, and a memory device coupled to the processor. The memory device may comprise a word line coupled to a first memory cell and a second memory cell, a memory block including a first cell string that includes the first memory cell and a second cell string that includes the second memory cell, and a program operation control unit configured to apply a precharge voltage to a drain select line coupled to one of the first and second a cell strings, before the program operation control unit applies a program voltage to the word line, the drain select line having a resistance, the precharge voltage being applied to the word line during a time period having a duration, which is determined from drain select line resistance.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms. Disclosed embodiments should not be construed as limiting the scope of the appurtenant claims.

Figure 1:
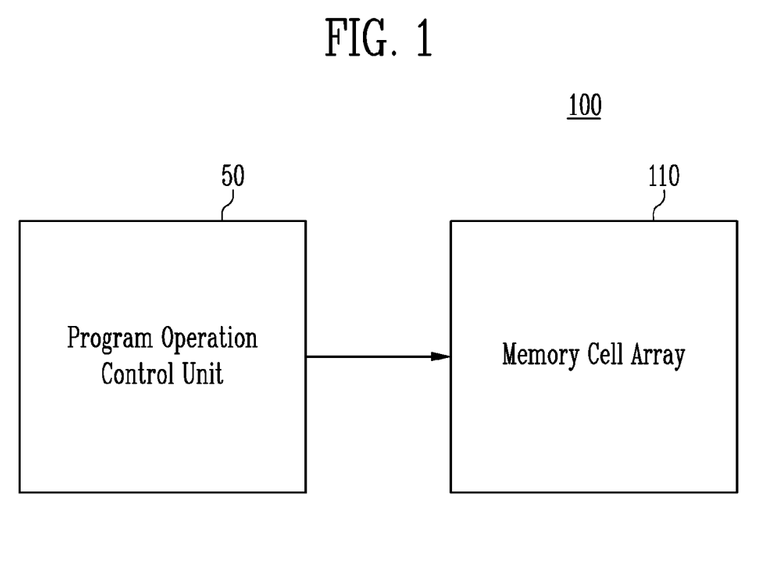
FIG. 1 is a block diagram of a memory device according to an embodiment of the present disclosure.

FIG. 1 is a block diagram of a memory device 100 according to an embodiment of the present disclosure. The memory device 100 may comprise a memory cell array 110 and a program operation control unit 50.

The memory cell array 110 may comprise a plurality of memory blocks, not shown in FIG. 1. Each memory block may comprise a plurality of cell strings, not shown in FIG. 1. Each cell string may comprise a plurality of memory cells, also not shown in FIG. 1. Each memory cell may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits. The detailed configuration of the plurality of memory blocks is described below with reference to FIGS. 3 and 4 together.

The program operation control unit 50 may control various different-magnitude voltages applied to drain select lines coupled to cell strings, before a program operation is performed, during a time determined depending on the resistance values of the drain select lines. Moreover, the program operation control unit 50 may apply a voltage the magnitude of which is determined by or "based on" relative electrical resistance of drain select lines coupled to cell strings before a program operation is performed. Accordingly, the accuracy of a memory device program operation may be improved by adjusting the rate at which a voltage applied to a drain select line having a high resistance value changes and, adjusting the rate at which a voltage applied to a drain select line having a low resistance value changes. A detailed description of drain select line program voltage change operation is described below with reference to FIG. 2.

Figure 2:
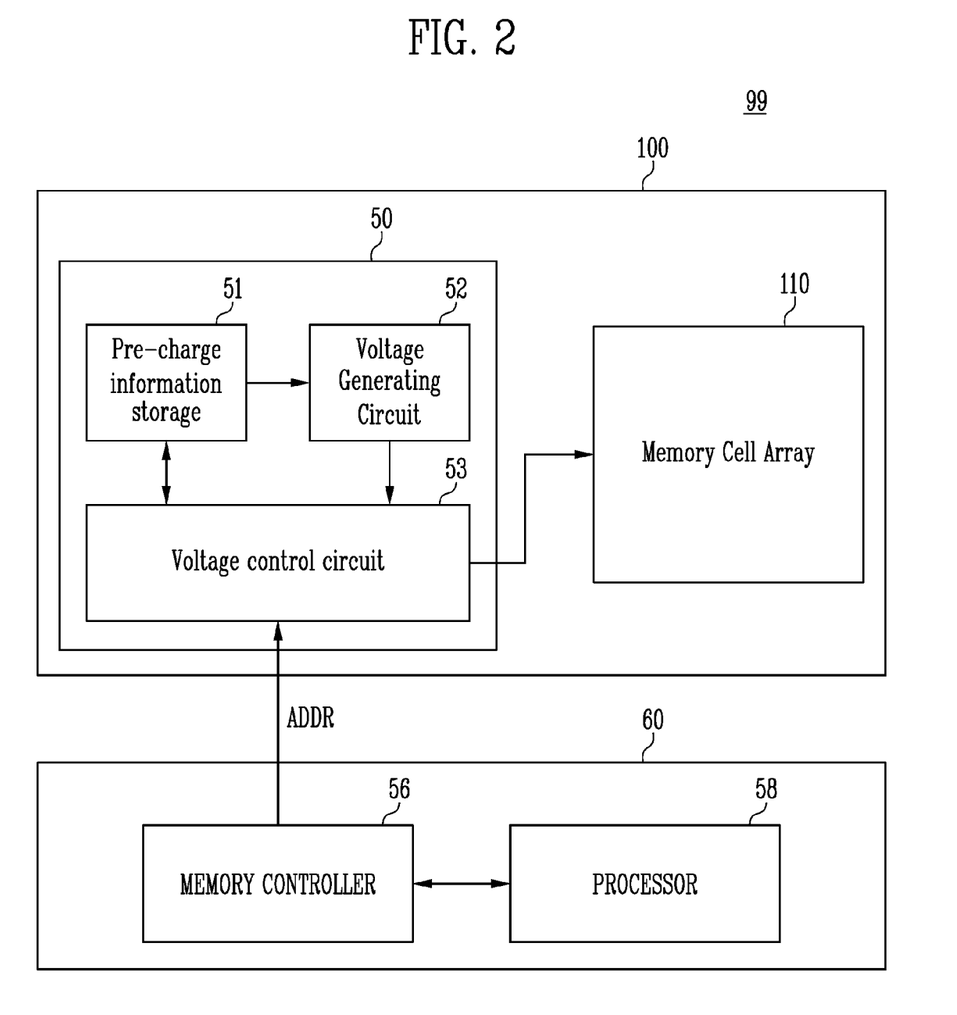
FIG. 2 is a block diagram of a computer system that includes a memory device according to an embodiment of the present disclosure.

FIG. 2 is a block diagram illustrating components of a computer system 99, which includes a memory device 100 depicted in FIG. 1, FIG. 3 and which is described below. As shown in FIG. 2, the program operation control unit 50 may comprise a precharge information store 51, which may be a memory wherein data is stored. The precharge information store 51 is thus hereinafter referred to as a precharge information storage 51. Still referring to FIG. 2, the program operation control unit 50 may also comprise, a voltage generating circuit 52, and a voltage control [unit] circuit 53.

The precharge information storage 51 may store voltage-application times. It may also store voltage magnitudes, which may be determined from resistance values of drain select lines in order perform a program precharge operation on a memory cell. A precharge operation "turns on" memory cells and may "turn on" a drain select transistor coupled to particular memory cells in order to perform a program operation on selected memory cells.

For example, the precharge information storage 51 may store the duration of a first setup period and store the duration of a second setup period. The second setup period duration may be longer than the first setup period duration. The precharge information storage 51 may also store precharge voltage information comprising the magnitude of a first precharge voltage applied to a drain select transistor as well as the magnitude of a second precharge voltage applied to the same drain select transistor. The second precharge voltage is usually greater than the first precharge voltage. The precharge information storage 51 may also store additional precharge information comprising whether a single precharge voltage is to be applied as a one-step precharge method or two, different-magnitude precharge voltages are to be applied as a two-step method, depending on drain select line resistance.

The precharge information storage 51 may output some or all of the aforementioned precharge information to the voltage control circuit 53 and the voltage generating circuit 52 under the control of the voltage control circuit 53. For example, the precharge information storage 51 may output information, specifying the first precharge voltage magnitude to the voltage generating circuit 52. The precharge information storage 51 may also output to the voltage control circuit 53, information specifying the duration of the first setup period.

The voltage generating circuit 52 may generate a voltage specified by precharge information received by the voltage generating circuit 52 from the precharge information storage 51. In some embodiments, when information about the magnitude of the first precharge voltage is received, the first precharge voltage may be generated thereafter. In some embodiments, when precharge information indicates using a two-step method, a first, step voltage having a first magnitude and a second voltage having a magnitude greater than that of the first, step voltage may be generated sequentially, i.e., the second and greater magnitude voltage being generated after the first, step voltage. The voltage generating circuit 52 may thus output to the voltage control circuit 53, voltages having different magnitudes.

The voltage control circuit 53 may receive an address ADDR from an external device, such as a memory controller 56 coupled to a processor 58, which together constitute a controller 60. When the voltage control circuit 53 in the memory device 100 receives an address ADDR from the memory controller 56, the voltage control circuit 53 may apply precharge voltages to the drain select lines, DSL, corresponding to the address ADDR.

For example, when an address ADDR corresponding to a drain select line having a low resistance value is received, the voltage control circuit 53 may control the precharge information storage 51 to output to the voltage generating circuit 52, information specifying the magnitude of a first precharge voltage. When the first precharge voltage is output from the voltage generating circuit 52, the voltage control circuit 53 may apply the first precharge voltage to the drain select line having a low resistance value. A similar sequence may occur for the application of a second precharge voltage.

Figure 3:
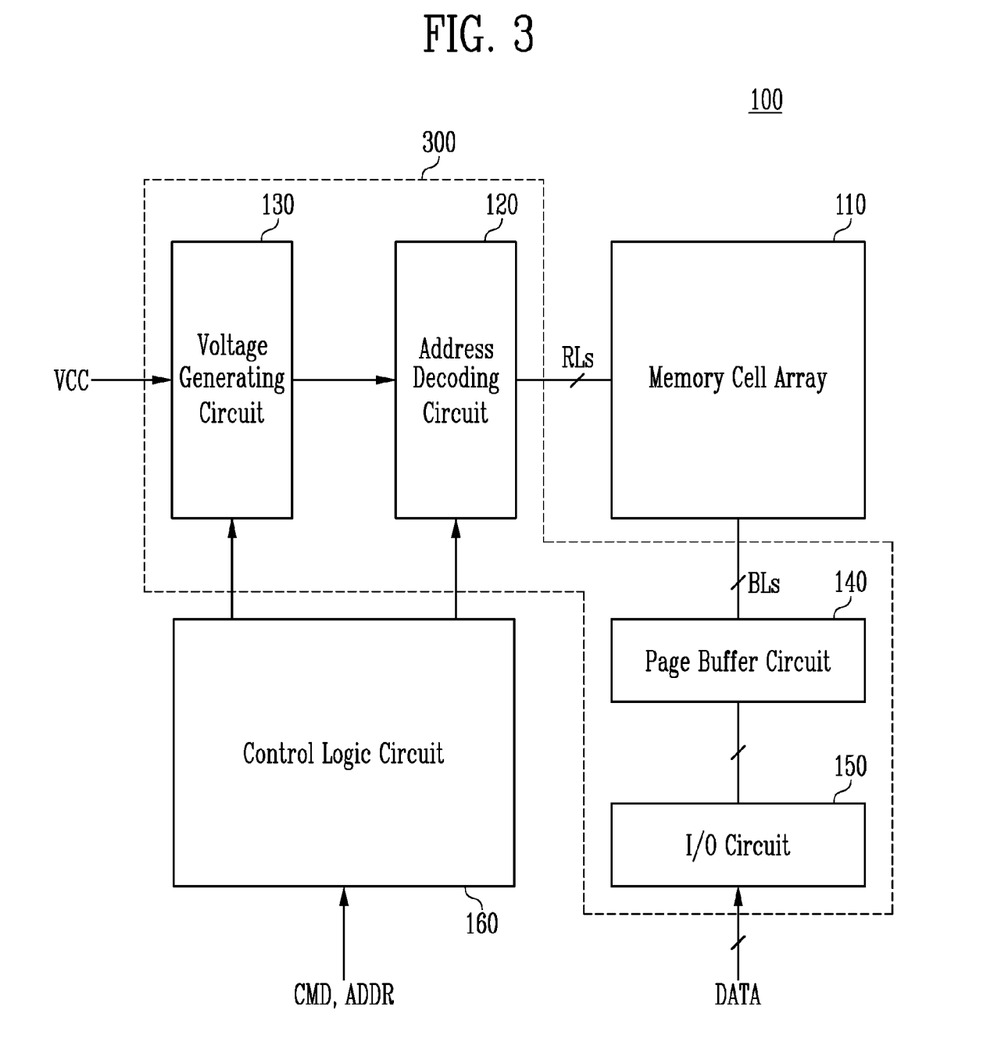
FIG. 3 is a detailed block diagram illustrating a memory device according to an embodiment of the present disclosure.

FIG. 3 is a detailed block diagram illustrating the memory device 100 according to an embodiment of the present disclosure. In some embodiments, the memory device 100 may be a nonvolatile memory device based on a NAND flash memory. However, the scope of the present disclosure is not limited thereto, and the memory device 100 may be one of various types of memory devices such as dynamic random access memory (DRAM), static RAM (SRAM), phase-change RAM (PRAM), magnetic RAM (MRAM), resistive RAM (RRAM), and ferroelectric RAM (FRAM).

Figure 4:
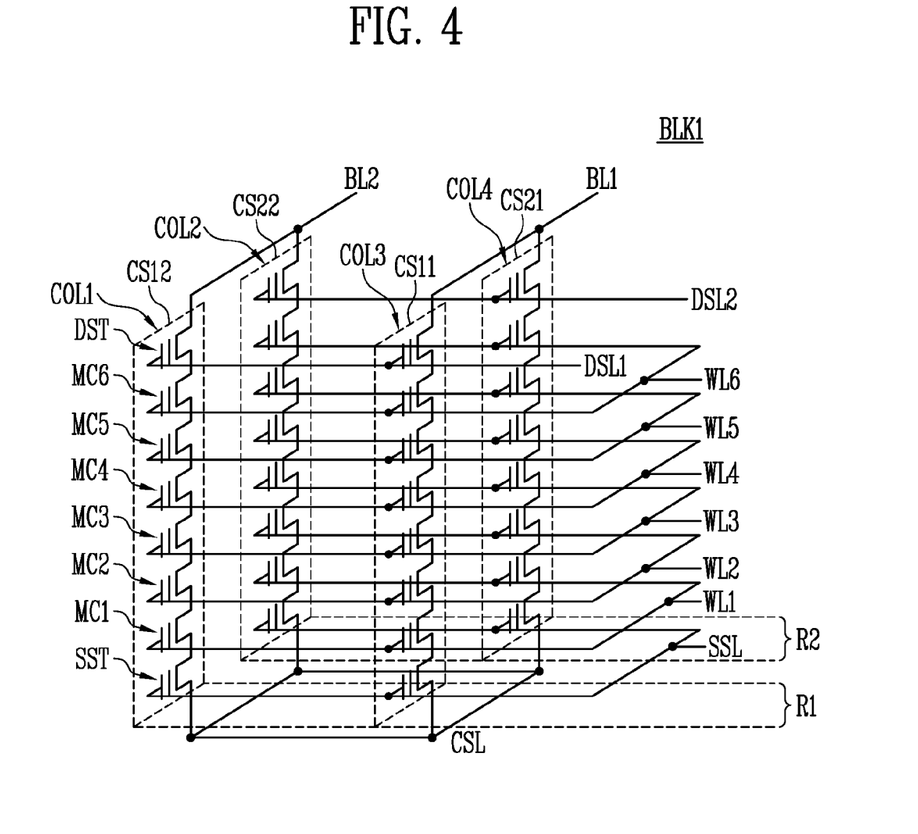
FIG. 4 illustrates a memory block.

Referring to FIG. 3 and FIG. 4, the memory device 100 may include a memory cell array 110, an address decoding circuit 120, a voltage generating circuit 130, a page buffer circuit 140, an input/output (I/O) circuit 150, and a control logic circuit 160.

In some embodiments, the memory device 100 may apply a voltage to a drain select line coupled to a selected cell string, the magnitude of the applied volage being determined from the drain select line resistance and the voltage being applied to a drain select line as part of a program operation. A detailed description of this operation is provided below with reference to FIGS. 7A to 9.

As shown by FIG. 4, which illustrates a memory block, the memory cell array 110 may include a plurality of memory blocks. Each memory block may include a plurality of cell strings. Each string may be coupled to the address decoding circuit 120 through row lines RLs, and may be coupled to the page buffer circuit 140 through bit lines BLs. The row lines RLs may include drain select lines, word lines, and source select lines.

Each cell string may include a plurality of memory cells. Each memory cell may comprise a plurality of cell transistors, which are coupled in series to each other, between bit lines BLs and the select transistors. The plurality of cell transistors may also be coupled to the drain select lines, the word lines, and the source select lines.

The word "peripheral" usually refers to a device coupled to a computer, which provides input and output functionality to the computer or which provides an auxiliary functions to the computer. As used herein, the word "peripheral" refers to the "device" identified by reference numeral 300, which as shown is coupled to the memory cell array 110. In the embodiment shown in FIG. 3, the address decoding circuit 120, the voltage generating circuit 130, the page buffer circuit 140, and the input/output (I/O) circuit 150 may be commonly referred to as a peripheral circuit 300. The peripheral circuit 300 may control operations of the memory cell array 110 under the control of the control logic circuit 160. The peripheral circuit 300 may thus control the memory cell array 110 to perform a program operation, a read operation, and an erase operation.

The address decoding circuit 120 may be coupled to the memory cell array 110 through row lines RLs. The address decoding circuit 120 may receive an individual address, a plurality of consecutive or non-consecutive individual addresses as well as one or more address ranges i.e., one or more address blocks, i.e., blocks of addresses, ADDR from the control logic circuit 160. The address decoding circuit 120 may decode the received address, a block or range of addresses i.e., the received addresses ADDR. The address decoding circuit 120 may then select at least one of the plurality of memory blocks according to the decoded block address.

The address decoding circuit 120 may decode a row address, among the received addresses ADDR. The address decoding circuit 120 may select at least one of word lines of the selected memory block according to the decoded row address.

In an embodiment, the address decoding circuit 120 may also decode a column address, among the received addresses ADDR. The address decoding circuit 120 may then couple the I/O circuit 150 to the memory cells in the memory cell array 110, which are specified by the decoded column address, which are referred to hereinafter as addressed memory cells.

After the I/O circuit 150 is coupled to the addressed memory cells, the voltage generating circuit 130 may generate various voltages required by various operations of memory device 100. For example, the voltage generating circuit 130 may generate various program voltages, pass voltages, verify voltages, select read voltages, unselect read voltages, erase voltages, and erase verify voltages, all of which are derived from an externally-provided power supply voltage, VCC.

In some embodiments, the voltage generating circuit 52 illustrated in FIG. 2 may be implemented as the voltage generating circuit 130 illustrated in FIG. 3. For example, the voltage generating circuit 130 may generate a first precharge voltage, a second precharge voltage, and a step voltage.

Still referring to FIG. 3, the page buffer circuit 140 may be coupled to the memory cell array 110 through bit lines BLs and may thus read data from and store data in the memory cell array 110. More specifically, the page buffer circuit 140 may read data stored in the memory cell array 110 by sensing voltage changes of bit line BL and may temporarily store the read data. The page buffer circuit 140 may receive the data from the I/O circuit 150 and may store that data in the memory cell array 110 by controlling voltages on the bit lines BLs based on data received by the page buffer circuit 140 from the I/O circuit 150.

As described above, the I/O circuit 150 may exchange data DATA with an external device (e.g., a memory controller). For example, the I/O circuit 150 may receive the data DATA from the external device, and may transfer the received data DATA to the page buffer circuit 140. The I/O circuit 150 may receive the data DATA from the page buffer circuit 140, and may transfer the received data to the external device.

Still referring to FIG. 3, the control logic circuit 160 may control the overall operation of the memory device 100. For example, the control logic circuit 160 may receive commands CMD and addresses ADDR from the external device (e.g., the memory controller). The control logic circuit 160 may thereafter generate and send various control signals to various components of the peripheral circuit 300 in response to received commands CMD and received addresses ADDR in order to control the peripheral circuit 300 and its components depicted in FIG. 3.

In some embodiments, the voltage control circuit 53 illustrated in FIG. 2 may be implemented using the address decoding circuit 120 and the control logic circuit 160. For example, the control logic circuit 160 may apply a voltage, the magnitude of which is determined by the resistance of a drain select line coupled to the selected cell string.

When an address ADDR corresponding to a drain select line having a low resistance value is received, the control logic circuit 160 may control a storage (not illustrated) to output information about the second precharge voltage to the voltage generating circuit 130. When the second precharge voltage is received from the voltage generating circuit 130, the address decoding circuit 120 may apply the second precharge voltage to the drain select line having a low resistance value.

Hereinafter, embodiments of the present disclosure will be described based on the program operation of the memory device 100 so as to easily describe the embodiments of the present disclosure.

FIG. 4 illustrates a single memory block of a plurality of memory blocks comprising the memory cell array 110 depicted in FIGS. 1, 2 and 3. In some embodiments, the memory device 100 of FIG. 1 may be a flash memory device.

Although the memory block depicted in FIG. 4 has a 3D structure, the scope of the present disclosure is not limited thereto. Other memory blocks may have a structure similar to the memory block BLK1, depicted in FIG. 4 and described below.

The memory block BLK1 may include a plurality of cell strings CS11, CS12, CS21, and CS22, which may be arranged in a horizontal row direction (i.e., horizontally across the plane of FIG. 4) and a vertical column direction (i.e., vertically on the plane of FIG. 4) on a substrate, not shown in FIG. 4, thus forming horizontal rows, (two shown, labelled R1 and R2) and vertical columns (four shown, labelled COL1-COL4).

Each cell string CS11, CS12, CS21, and CS22 may comprise a plurality of serially-connected cell transistors. For example, the cell string CS12 may include a drain select transistor DST, which is connected in series to a plurality of serially-connected memory cells MC1 to MC6, which are connected in series to a source select transistor SST.

The drain select transistors DST may be coupled to corresponding drain select lines. In FIG. 4, the drain select transistor, DST, for the cell string identified as CS12 is coupled to drain select line DSL1. Similarly, the drain select transistor, DST, for the cell string identified as CS22 is coupled to drain select line DSL2.

As FIG. 4 shows, drain select lines and the several word lines may be laid or formed, on top of each other, such that the drain select lines and word lines are "stacked" vertically above each other. Each of the structures may be considered a layer of a structure, with each stacked "layer" being located at progressively greater distances above a substrate on which the memory block BLK1 is formed.

Cell strings in the same horizontal row, R1 may share a drain select line. For example, the cell string CS11 and the cell string CS12 may share the first drain select line DSL1. Cell string CS21 and cell string CS22 may share the second drain select line DSL2. While FIG. 4 shows two cell strings sharing one drain select line, in other embodiments not shown, eight or more cell strings having the same (or substantially the same) structure as the cell strings shown in FIG. 4, may share one drain select line with each other.

Still referring to FIG. 4, the first to sixth memory cells MC1 to MC6 may be coupled to a single, corresponding word line of the first to sixth word lines WL1 to WL6. By way of example, memory cell MC1 may be coupled to word line WL1. Memory cell MC6 may be coupled to word line WL6.

As FIG. 4 shows, a memory cell, MCn at a particular vertical elevation or location "above" a substrate on which the memory block BLK1 is formed, is coupled to a corresponding word line WL, which is at the same or substantially the same elevation or location above the same substrate. Each memory cell MC1-MC6 and its corresponding word line WL are thus located at the same (or substantially the same) height or elevation above the substrate on which the memory block BLK1 is formed. Memory cells MCn of different cell strings CSn, which are at the same elevation may thus share the same word line, WLn with each other. For example, each cell string CS12, CS11, CS22 and CS21 has a memory cell denominated as "MC6." Each MC6 is located in the substantially same horizontal plane, i.e., the same vertical distance above the substrate on which the memory block BLK1 was formed. Since the memory cells MC6 are at the same height they may share the word line with each other.

Similarly, multiple source select transistors SST may be coupled to the same source select line SSL. Cell strings in the same horizontal row (depicted in FIG. 4 as being across the plane of FIG. 4 and at the same "depth" into the plane of FIG. 4) may share the source select line SSL with each other. Similarly, cell strings in different horizontal rows (depicted in FIG. 4 as being at different "depths" into the plane of FIG. 4) may also share the source select line SSL with each other.

Figure 5:
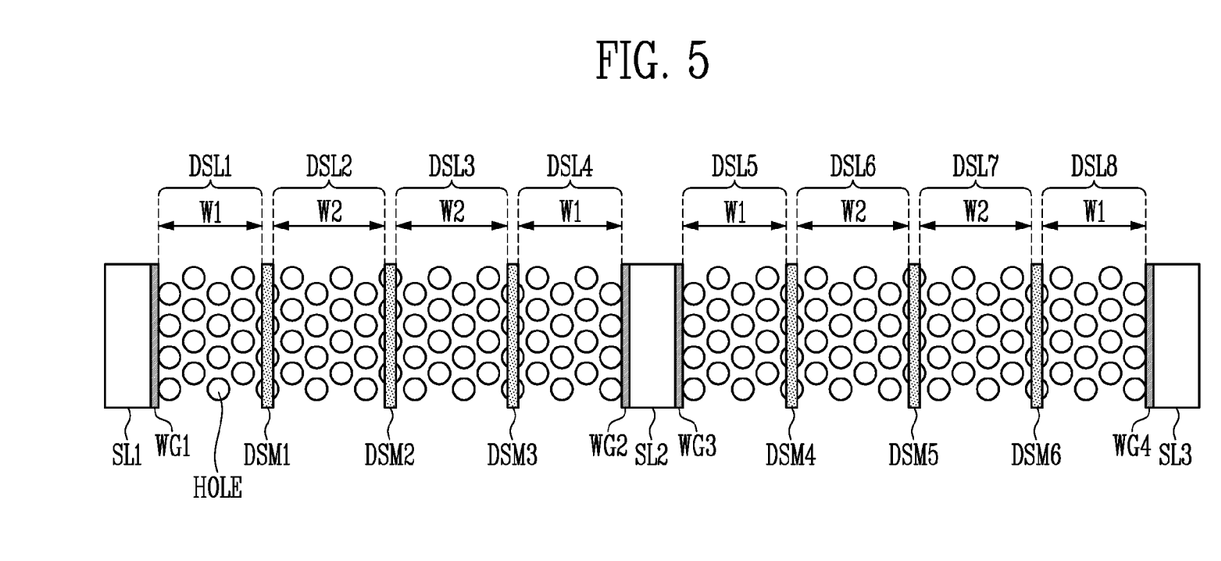
FIG. 5 is a diagram illustrating a plurality of drain select lines in cross section.

FIG. 5 is a vertical cross-sectional diagram illustrating locations of a plurality of drain select lines, relative to each other. FIG. 5 thus depicts an "end view," "looking into" the drain select lines DSL1-DSL8 of a memory block, relative to surrounding structures, which drain select lines are formed in and with. FIG. 5 is not drawn to scale.

Referring to FIG. 5, the memory cell array may include first to eighth drain select lines DSL1 to DSL8, first to third slits SL1 to SL3, first to sixth separation patterns DSM1 to DSM6, first to fourth wing regions WG1 to WG4, and a plurality of holes HOLE.

Each drain select line DSL1 to DSL8 may correspond to a drain select line illustrated in FIG. 4. Each slit SL1 to SL3 may be a region between and which separates the aforementioned stacked word lines into blocks but which also couple a peripheral circuit to the bottom of a stacked structure through metal.

In some embodiments, the first to fourth drain select lines DSL1 to DSL4 may be arranged in series between the first slit SL1 and the second slit SL2, and the fifth to eighth drain select lines DSL5 to DSL8 may be arranged in series between the second slit SL2 and the third slit SL3.

The first to sixth separation patterns (also referred to as drain select line separation masks) DSM1 to DSM6 may be masks which distinguish drain select lines from each other. For example, the first separation pattern DSM1 may distinguish the first drain select line DSL1 from the second drain select line DSL2. The second separation pattern DSM2 may distinguish the second drain select line DSL2 from the third drain select line DSL3.

The plurality of drain select lines DSL1 to DSL8 in FIG. 5 may be electrically connected to drain select transistors as shown in FIG. 4. For example, a first drain select transistor DST, not shown in FIG. 5, may be formed on a semiconductor substrate and electrically coupled or connected to the first drain select line DSL1. A second drain select transistor DST, not shown in FIG. 5, may be formed on a semiconductor substrate and electrically coupled or connected to the second drain select line DSL2.

Each drain select transistor of a plurality of drain select transistors may thus be coupled to a corresponding cell string of a plurality of cell strings. For example, a first drain select transistor may be coupled to the first cell string. A second drain select transistor may be coupled to a second cell string and so on.

Among the plurality of drain select lines DSL1 to DSL8, each drain select line adjacent and in contact with a slit, SL1, SL2 or SL3, may comprise an associated wing region, WG1, WG2, WG3, WG4. For example, the first drain select line DSL1 adjacent and in contact with the first slit SL1 may include a first wing region WG1. The fourth drain select line DSL4 adjacent and in contact with the second slit SL2 may include a second wing region WG2. The fifth drain select line DSL5 adjacent and in contact with the second slit SL2 may include a third wing region WG3, and the eighth drain select line DSL8 adjacent and in contact with the third slit SL3 may include a fourth wing region WG4.

Among the plurality of drain select lines DSL1 to DSL8, the drain select lines, each comprising an associated wing region, may be referred to as "outer lines." Among the drain select lines DSL1~DSL8, drain select lines that do not have an associated wing region may be referred to as "inner lines."

For example, each of the first, fourth, fifth, and eighth drain select lines DSL1, DSL4, DSL5, and DSL8 may be referred to as an outer line, and each of the second, third, sixth, and seventh drain select lines DSL2, DSL3, DSL6, and DSL7 may be referred to as an inner line. Each inner line may be spaced apart from wing regions.

In some embodiments, the distance between a cell string coupled to an outer line, i.e., one of DSL1, DSL4, DSL5, and DSL8 and a corresponding slit may be shorter than the distance between a cell string coupled to an inner line, i.e., one of DSL2, DSL3, DSL6, and DSL7 and a corresponding slit. For example, the separation distance between the first cell string coupled to the first drain select line DSL1 and the first slit SL1, may be less than the separation distance between the second cell string coupled to the second drain select line DSL2 and the first slit SL1.

Each outer line, i.e., one of DSL1, DSL4, DSL5, and DSL8, may have a first width W1. Each inner line, i.e., one of DSL2, DSL3, DSL6, and DSL7, may have a second width W2 narrower than the first width W1. Since the inner lines are narrower than the outer lines, the resistance of the inner lines will inherently be greater than the resistance of the wider outer lines. That is, the direct current (D.C.) resistance of the inner lines will be greater than the D.C. resistance of the outer lines. For example, when the resistance value of the outer line is 'R', the resistance value of the inner line may be '1.3R'.

Each of the plurality of holes HOLE may be a channel hole, or void, formed at a depth at which the substrate can be exposed by etching the plurality of drain select lines DSL1 to DSL8, the plurality of word lines, and the source select line SSL. Because holes are voids, holes are not conductive.

Figure 6A:
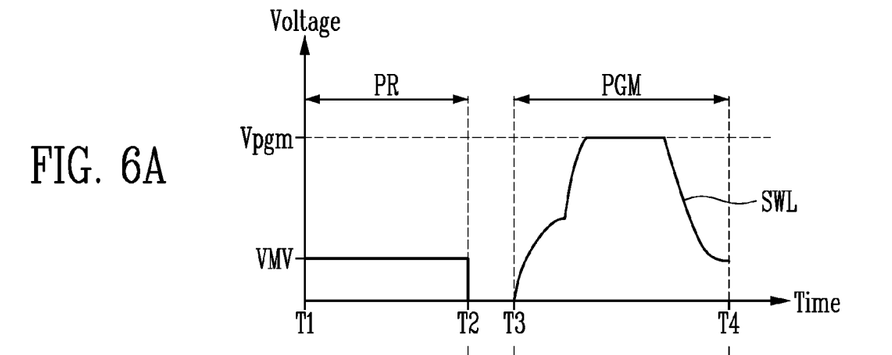
FIGS. 6A and 6B are graphs illustrating a phenomenon that occurs when equal magnitude voltages are applied to an "outer" drain select line and an "inner" drain select line.
Figure 6B:
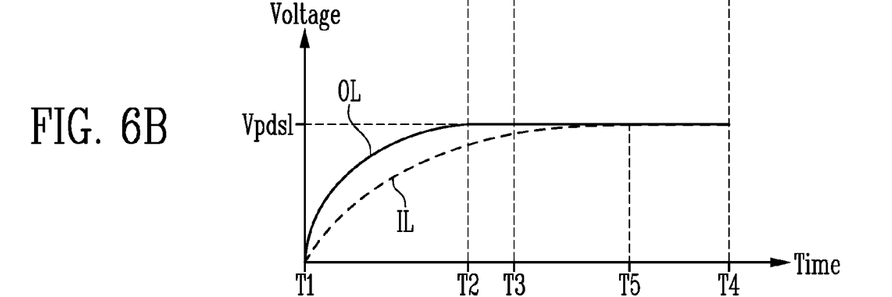

FIGS. 6A and 6B together depict a phenomenon that occurs when a voltage (i.e., the same voltage) is applied to an "outer" drain select line and an "inner" drain select line, the outer drain select line having an electrical resistance less than the resistance of the inner drain select line. The horizontal axes denote time. The vertical axes denote the magnitude of a voltage applied to a drain select line.

In FIG. 6B, the outer line OL may be any one of the first, fourth, fifth, and eighth drain select lines DSL1, DSL4, DSL5, and DSL8 depicted in FIG. 5. The inner line IL may be any of second, third, sixth, and seventh drain select lines DSL2, DSL3, DSL6, and DSL7 also depicted in FIG. 5.

FIG. 6A depicts graphs of voltages applied to a selected word line SWL that an address decoding circuit may apply to the selected word line SWL during a setup period PR between a time point T1 and a time point T2, both of which are prior to a program time period that begins at T3 and ends at T4. The applied voltage VMV during the setup period PR may be a voltage for "turning on" memory cells coupled to the selected word line SWL. The setup period PR, i.e., between T1 and T2, may be a time period during which memory cells and a drain select transistor coupled to the memory cells are turned on so as to perform a program operation between T3 and T4.

Between time point T3 and time point T4, the address decoding circuit may apply a program voltage Vpgm to the selected word line SWL during a program period PGM. The program voltage Vpgm may be a voltage that is applied to program data into memory cells during a program operation.

In FIG. 6B, which is a graph of the outer line OL voltage and the inner line IL voltage, the same precharge voltage is applied to the outer line OL and the inner line IL during the setup period PR, which is between T1 and T2. Because the inner line IL resistance is greater than the outer line OL resistance, the inner line IL voltage may rise more slowly, i.e., take more time, than that of the outer line OL voltage, to reach Vpdsl.

As FIG. 6B shows, the outer line OL voltage may reach a drain select voltage of Vpdsl at time point T2, whereas the inner line IL voltage may not reach the same Vpdsl value until the later time point T5. The drain select voltage Vpdsl may be a voltage for turning on a drain select transistor corresponding to a drain select line. The outer line OL may have the drain select voltage Vpdsl during the setup period PR, whereas the inner line IL may have the drain select voltage Vpdsl during the program period PGM.

When the inner line IL voltage is less than the drain select voltage Vpdsl, a program voltage is applied to the selected word line SWL, and the cell to be programmed is set to be program-inhibited, with the result that cell features may be deteriorated. Accordingly, there is a need to prevent cell features from being deteriorated by applying different-magnitude voltages to the outer lines OL and the inner lines IL.

Figure 7A:
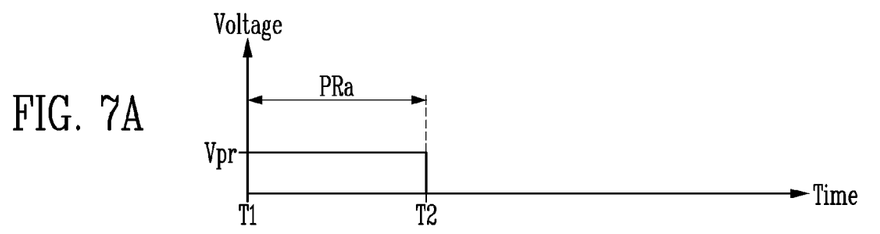
FIGS. 7A, 7B and 7C, are graphs, illustrating voltages applied to an outer line and an inner line according to some embodiments of the present disclosure.
Figure 7B:
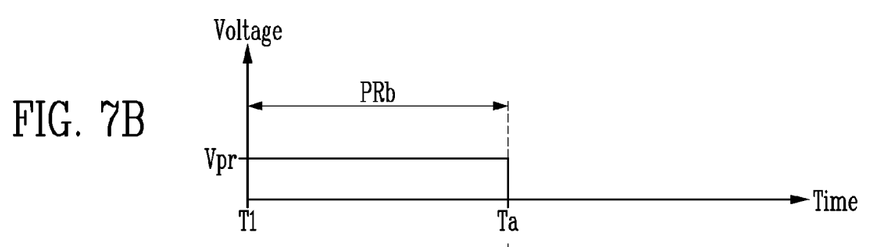
Figure 7C:
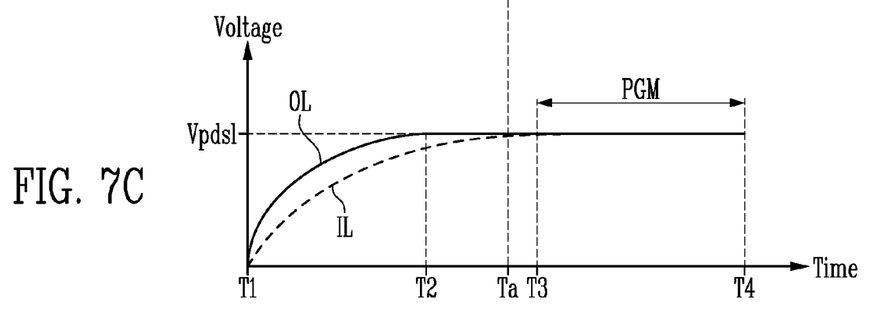

FIGS. 7A, 7B and 7C depict graphs illustrating voltages applied to inner and outer drain select lines of the memory block depicted in FIG. 4 and which explain time points at which voltages are applied to an outer line and an inner line according to some embodiments of the present disclosure. The horizontal axis denotes time; the vertical axis denotes voltage magnitude.

Referring to FIG. 7A, which is a graph of voltages applied to the outer line OL, the voltage control circuit 53 may apply a precharge voltage Vpr to the outer line OL during a first setup period PRa between a time point T1 and a time point T2.

For example, the voltage control circuit 53 may receive an address ADDR corresponding to the outer line OL. The voltage control circuit 53 may control the precharge information storage 51 to output information about the precharge voltage Vpr to the voltage generating circuit 52 and to output information about the first setup period PRa to the voltage control circuit 53. The voltage generating circuit 52 may generate the precharge voltage Vpr based on the information about the precharge voltage Vpr. The voltage control circuit 53 may apply the precharge voltage Vpr to the outer line OL during the first setup period PRa.

Referring to FIG. 7B, which is a graph of voltages applied to the inner line IL, the voltage control circuit 53 may apply the precharge voltage Vpr to the inner line IL during a second setup period PRb between time point T1 and a time point Ta. The time point Ta may be present between the time point T2 and a time point T3. The duration of the second setup period PRb may be longer than the duration of the first setup period PRa.

For example, the voltage control circuit 53 may receive an address ADDR corresponding to the inner line IL. The voltage control circuit 53 may control the precharge information storage 51 to output information about the precharge voltage Vpr to the voltage generating circuit 52 and to output information about the second setup period PRb to the voltage control circuit 53. The voltage generating circuit 52 may generate the precharge voltage Vpr based on the information about the precharge voltage Vpr. The voltage control circuit 53 may apply the precharge voltage Vpr to the inner line IL during the second setup period PRb.

Referring to FIG. 7C, which is a graph of the outer line OL voltage and the inner line IL voltage between T1 and T4, the outer line OL may have a drain select voltage Vpdsl at the time point T2, whereas the inner line IL may not reach the drain select voltage Vpdsl until time point T3, which is much later than T2. Furthermore, both the end time point T2 of the first setup period PRa and the end time point Ta of the second setup period PRb may be time points before the start time point T3 of the program period PGM.

As the voltage control circuit 53 applies the precharge voltage Vpr to the inner line IL for a time longer than that of the outer line OL, both the outer line OL and the inner line IL may have the drain select voltage Vpdsl before the start time point T3 of the program period PGM.

Referring to the graph of the inner line IL in FIG. 6B, the inner line IL may have the drain select voltage Vpdsl after the start time point of the program period PGM. On the other hand, referring to the graph of the inner line IL in FIG. 7C, the inner line IL may have the drain select voltage Vpdsl at the time point Ta earlier than the start time point of the program period PGM. Accordingly, the cell deterioration phenomenon described with reference to FIGS. 6A and 6B may be prevented.

Figure 8:
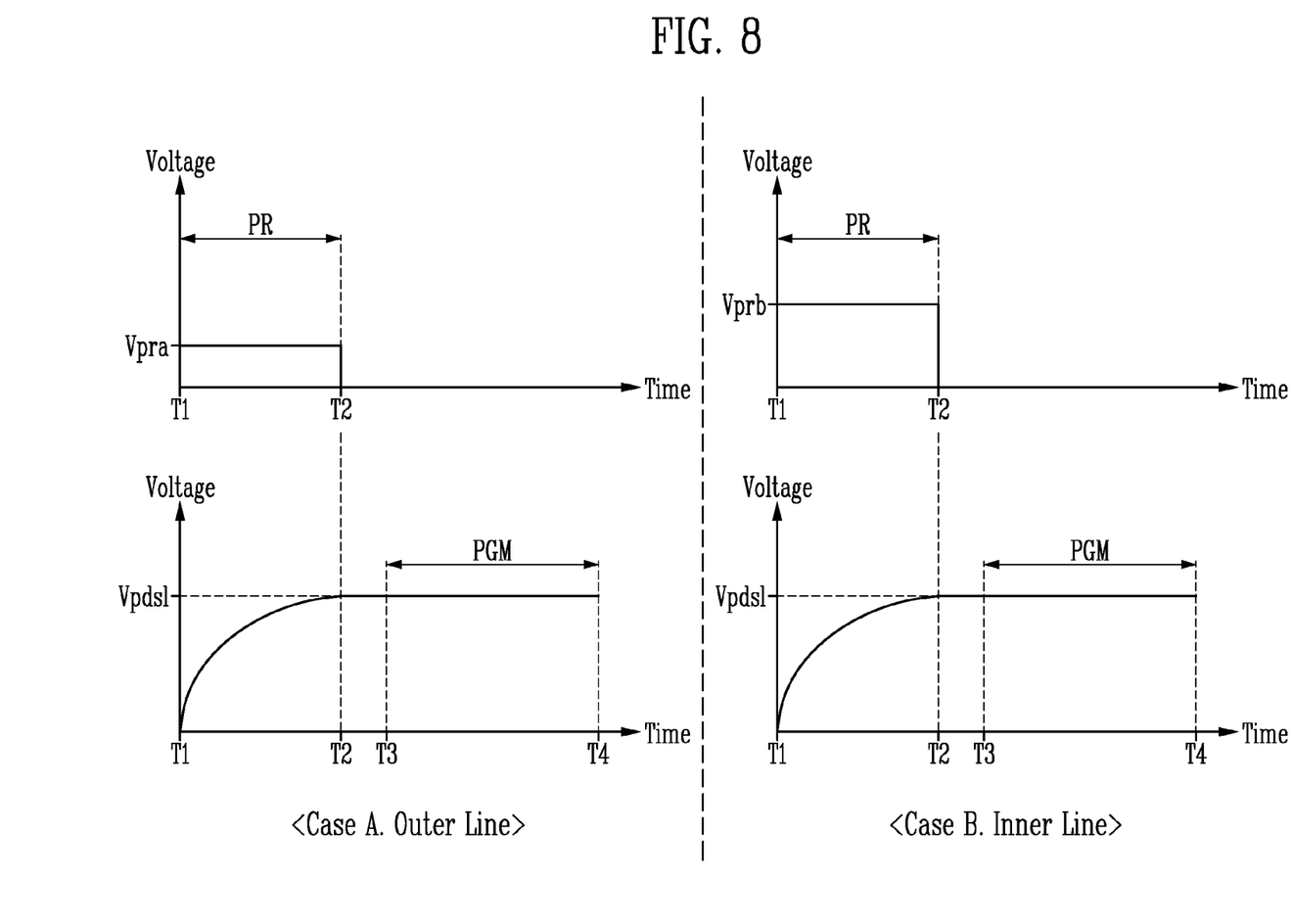
FIG. 8 is two graphs, illustrating voltages applied to an outer line and an inner line according to some embodiments of the present disclosure.

FIG. 8 illustrates graphs for explaining voltages applied to an outer line and an inner line according to some embodiments of the present disclosure. Referring to FIG. 8, graphs for explaining voltages applied to the outer line OL and the inner line IL are illustrated. The horizontal axis denotes time and the vertical axis denotes the magnitude of voltage.

Referring to a graph corresponding to the outer line OL, the voltage control circuit 53 may apply a first precharge voltage Vpra to the outer line OL during a setup period PR between a time point T1 and a time point T2.

For example, the voltage control circuit 53 may receive an address ADDR corresponding to the outer line OL. The voltage control circuit 53 may control the precharge information storage 51 to output information about the first precharge voltage Vpra to the voltage generating circuit 52 and to output information about the setup period PR to the voltage control circuit 53. The voltage generating circuit 52 may generate the first precharge voltage Vpra based on the information about the first precharge voltage Vpra. The voltage control circuit 53 may apply the first precharge voltage Vpra to the outer line OL during the setup period PR.

Referring to a graph corresponding to the inner line IL, the voltage control circuit 53 may apply a second precharge voltage Vprb to the inner line IL during the setup period PR between the time point T1 and the time point T2. The second precharge voltage Vprb may be higher than the first precharge voltage Vpra.

For example, the voltage control circuit 53 may receive an address ADDR corresponding to the inner line IL. The voltage control circuit 53 may control the precharge information storage 51 to output information about the second precharge voltage Vprb to the voltage generating circuit 52, and to output information about the setup period PR to the voltage control circuit 53. The voltage generating circuit 52 may generate the second precharge voltage Vprb based on the information about the second precharge voltage Vprb. The voltage control circuit 53 may apply the second precharge voltage Vprb to the inner line IL during the setup period PR.

Referring to graphs of the outer line OL and the inner line IL, the outer line OL may have a drain select voltage Vpdsl at the time point T2, and the inner line IL may have the drain select voltage Vpdsl at the time point T2.

Because the voltage control circuit 53 controls the voltage generating circuit and the address decoding circuit so that the precharge voltage, higher than that of the outer line OL, is applied to the inner line IL, both the outer line OL and the inner line IL may have the drain select voltage Vpdsl before the start time point of the program period PGM. That is, the control logic circuit may adjust the voltage rise slope of the inner line IL by applying the voltage, higher than that of the outer line OL, to the inner line IL.

Referring to the graph of the inner line IL in FIGS. 6A and 6B, the inner line IL may have the drain select voltage Vpdsl after the start time point of the program period PGM. On the other hand, referring to the graph of the inner line IL in FIG. 8, the inner line IL may have the drain select voltage Vpdsl at the time point T2 earlier than the start time point of the program period PGM. Accordingly, the cell deterioration phenomenon described with reference to FIGS. 6A and 6B may be prevented.

Figure 9:
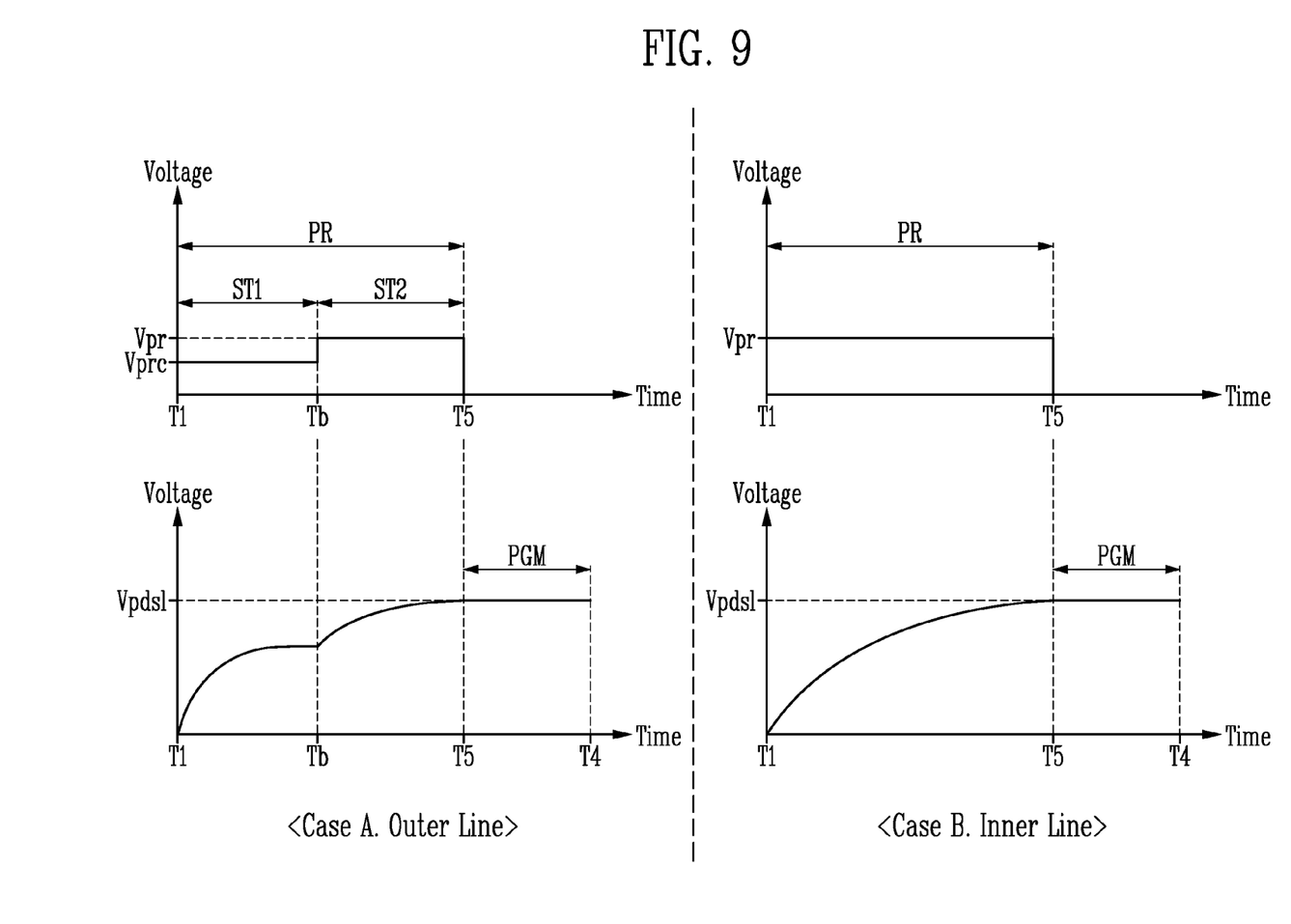
FIG. 9 is two graphs, illustrating, voltages applied to an outer line and an inner line according to some embodiments of the present disclosure.

FIG. 9 illustrates graphs for explaining voltages applied to an outer line and an inner line according to some embodiments of the present disclosure. Referring to FIG. 9, graphs for explaining voltages applied to the outer line OL and the inner line IL are illustrated. The horizontal axis denotes time and the vertical axis denotes the magnitude of voltage.

Referring to a graph corresponding to the outer line OL, the voltage control circuit 53 may apply voltages to the outer line OL using a two-step method during a setup period PR between a time point T1 and a time point T5. More specifically, the voltage control circuit 53 may apply a step voltage Vprc to the outer line OL during a first step period ST1 between the time point T1 and a time point Tb, and may apply a precharge voltage Vpr to the outer line OL during a second step period ST2 between the time point Tb and the time point T5. The precharge voltage Vpr may be higher than the step voltage Vprc.

For example, the voltage control circuit 53 may receive an address ADDR corresponding to the outer line OL. The voltage control circuit 53 may control the precharge information storage 51 to output information indicating 'application of voltages using a two-step method' to the voltage generating circuit 52 and to output information about the first step period ST1 and the second step period ST2 to the voltage control circuit 53. The voltage generating circuit 52 may generate the step voltage Vprc and the precharge voltage Vpr based on the information indicating 'application of voltages using a two-step method.' The precharge voltage Vpr may be higher than the step voltage Vprc. The voltage control circuit 53 may apply the step voltage Vprc to the outer line OL during the first step period ST1, and may apply the precharge voltage Vpr to the outer line OL during the second step period ST2.

Referring to the graph corresponding to the inner line IL, the voltage control circuit 53 may apply the precharge voltage Vpr to the inner line IL during the setup period PR between the time point T1 and the time point T5.

For example, the voltage control circuit 53 may receive an address ADDR corresponding to the inner line IL. The voltage control circuit 53 may control the precharge information storage 51 to output information indicating 'application of a voltage using a one-step method' to the voltage generating circuit 52 and to output information about the setup period PR to the voltage control circuit 53. The voltage generating circuit 52 may generate the precharge voltage Vpr based on the information indicating 'application of a voltage using a one-step method.' The voltage control circuit 53 may apply the precharge voltage Vpr to the inner line IL during the setup period PR.

Referring to the graphs of the outer line OL and the inner line IL, the outer line OL may have a drain select voltage Vpdsl at the time point T5, and the inner line IL may have the drain select voltage Vpdsl at the time point T5. That is, the control logic circuit may control, i.e., change the voltage rise rate or, slope of the outer line OL voltage, by applying the voltages to the outer line OL in two successive operations, referred to herein as a "two-step method." The end time point T5 of the setup period RP of the outer line OL and the inner line IL may be a time point before the program period PGM.

Referring to the graph of the inner line IL in FIGS. 6A and 6B, the inner line IL may have the drain select voltage Vpdsl at the time point T5 later than the time point T2 at which the outer line OL has the drain select voltage Vpdsl. On the other hand, referring to the graphs in FIG. 9, the control logic circuit may delay the time point at which the outer line OL has the drain select voltage Vpdsl by adjusting the voltage rise slope of the outer line OL. Accordingly, both the outer line OL and the inner line IL may have the drain select voltage Vpdsl at the time point T5.

Furthermore, referring to FIG. 9, after the time point T5 at which both the outer line OL and the inner line IL have the drain select voltage Vpdsl, the program period PGM starts, and thus the cell deterioration phenomenon described with reference to FIGS. 6A and 6B may be prevented.

Those of ordinary skill in the art should appreciate the advantages of applying different voltages to drain select lines as disclosed herein. At least one advantage is that a memory cell failure may be reduced by individually applying different voltages to different drain select lines, the voltage differences being determined by different electrical resistances, which are caused by drain select lines having different electrical resistances. The true scope of the invention is set forth in the following claims.

What is claimed is:

1. A memory device, comprising:
a word line coupled to a first memory cell and a second memory cell, a memory block including a first cell string and a second cell string, the first cell string including the first memory cell, the second cell string including the second memory cell; and
a program operation control unit configured to apply a precharge voltage, to a drain select line coupled to one of the first and second cell strings, before the program operation control unit applies a program voltage to the word line, the precharge voltage being applied to the drain select line during a time period having a duration, which is determined from the electrical resistance of the drain select line,
wherein the program operation control unit is further configured to determine the duration of the time period increases as the electrical resistance of the drain select line increases.

2. The memory device according to claim 1, wherein the memory block comprises:
a first drain select line coupled to the first cell string; and
a second drain select line coupled to the second cell string.

3. The memory device according to claim 2, wherein the program operation control unit comprises:
a precharge information storage comprising information specifying a first precharge voltage to be applied to the first drain select line and specifying a second precharge voltage to be applied to the second drain select line;
a voltage generating circuit configured to generate the first and second precharge voltages; and
a voltage control circuit configured to apply at least one of the specified first and second precharge voltages to a drain select line coupled to the selected cell string.

4. The memory device according to claim 3, wherein the information specifying the first and second precharge voltages includes information specifying precharge voltage magnitudes.

5. The memory device according to claim 4, wherein the program operation control unit is configured to:
when the first cell string is selected, apply the first precharge voltage to the first drain select line before the program voltage is applied to the word line, and
when the second cell string is selected, apply the second precharge voltage, that is greater than the first precharge voltage, to the second drain select line before the program voltage is applied to the word line,
wherein a resistance of the first drain select line is lower than a resistance of the second drain select line.

6. The memory device according to claim 3, wherein the information specifying the first and second precharge voltages specifies durations which a precharge voltage is to be applied.

7. The memory device according to claim 6, wherein the program operation control unit is configured to:
when the first cell string is selected, apply the first precharge voltage to the first drain select line during a first setup period, and
when the second cell string is selected, apply the second precharge voltage to the second drain select line during a second setup period longer than the first setup period,
wherein a resistance of the first drain select line is lower than a resistance of the second drain select line.

8. The memory device according to claim 7, wherein:
an end time point of the first setup period is prior to a start time point of a period during which a program voltage for data storage is applied to the first memory cell, and
an end time point of the second setup period is prior to a start time point of a period during which the program voltage is applied to the second memory cell.

9. The memory device according to claim 2, wherein:
the memory block further includes a slit;
the first drain select line includes a wing region adjacent to and in contact with the slit; and
the second drain select line is spaced apart from the wing region.

10. The memory device according to claim 9, wherein a distance between the first cell string and the slit is less than a distance between the second cell string and the slit.

11. The memory device according to claim 2, wherein:
the memory block further includes a slit, a first separation pattern, and a second separation pattern,
the first drain select line is disposed between the slit and the first separation pattern, and
the second drain select line is disposed between the first separation pattern and the second separation pattern.

12. A memory device, comprising:
a word line comprising a first memory cell and a second memory cell;
a memory block including a first cell string and a second cell string, the first cell string including the first memory cell, the second cell string including the second memory cell; and
a program operation control unit configured to determine whether to apply a first precharge voltage to a drain select line coupled to a cell string selected from the first cell string and the second cell string and thereafter apply a second precharge voltage, greater than the first precharge voltage, to the drain select line before a program voltage is applied to the word line, the first and second precharge voltages being applied during a time determined from a resistance of the drain select line coupled to the selected cell string.

13. The memory device according to claim 12, wherein the memory block includes a first drain select line coupled to the first cell string and a second drain select line coupled to the second cell string.

14. The memory device according to claim 13, wherein the program operation control unit is configured to:
when the first cell string is selected, apply the first precharge voltage to the first drain select line and thereafter apply the second precharge voltage to the first drain select line before the program voltage is applied to the word line, and
when the second cell string is selected, apply the second precharge voltage to the second drain select line, before the program voltage is applied to the word line,
wherein a resistance of the first drain select line is less than a resistance of the second drain select line.

15. The memory device according to claim 14, wherein the program operation control unit is configured to:
when the first cell string is selected, apply the first precharge voltage to the first drain select line during a period from a start time point to a middle time point of a setup period; and
apply the second precharge voltage to the first drain select line during a period from the middle time point to an end time point of the setup period, wherein the end time point of the setup period is before a time point at which the program voltage is applied, and
wherein the second precharge voltage is greater than the first precharge voltage.

16. The memory device according to claim 13, wherein:
the memory block further includes a slit,
the first drain select line includes a wing region adjacent to and in contact with the slit, and
the second drain select line is spaced apart from the wing region.

17. The memory device according to claim 16, wherein a distance between the first cell string and the slit is less than a distance between the second cell string and the slit.

18. The memory device according to claim 13, wherein:
the memory block further includes a slit, a first separation pattern, and a second separation pattern,
the first drain select line is disposed between the slit and the first separation pattern, and
the second drain select line is disposed between the first separation pattern and the second separation pattern.

19. A computer system comprising:
a processor;
a memory device coupled to the processor, the memory device comprising:
a word line coupled to a first memory cell and a second memory cell;
a memory block including a first cell string that includes the first memory cell and a second cell string that includes the second memory cell; and
a program operation control unit configured to apply a precharge voltage to a drain select line coupled to one of the first and second cell strings, before the program operation control unit applies a program voltage to the word line, the drain select line having a resistance, the precharge voltage being applied to the drain select line during a time period having a duration, which is determined from the resistance of the drain select line,
wherein the program operation control unit is further configured to determine a magnitude of the precharge voltage increases as the electrical resistance of the drain select line increases.

* * * * *